Feb. 11, 1930.  O. H. ENSIGN  1,746,728
INTERNAL COMBUSTION ENGINE
Filed Nov. 6, 1926  3 Sheets-Sheet 1
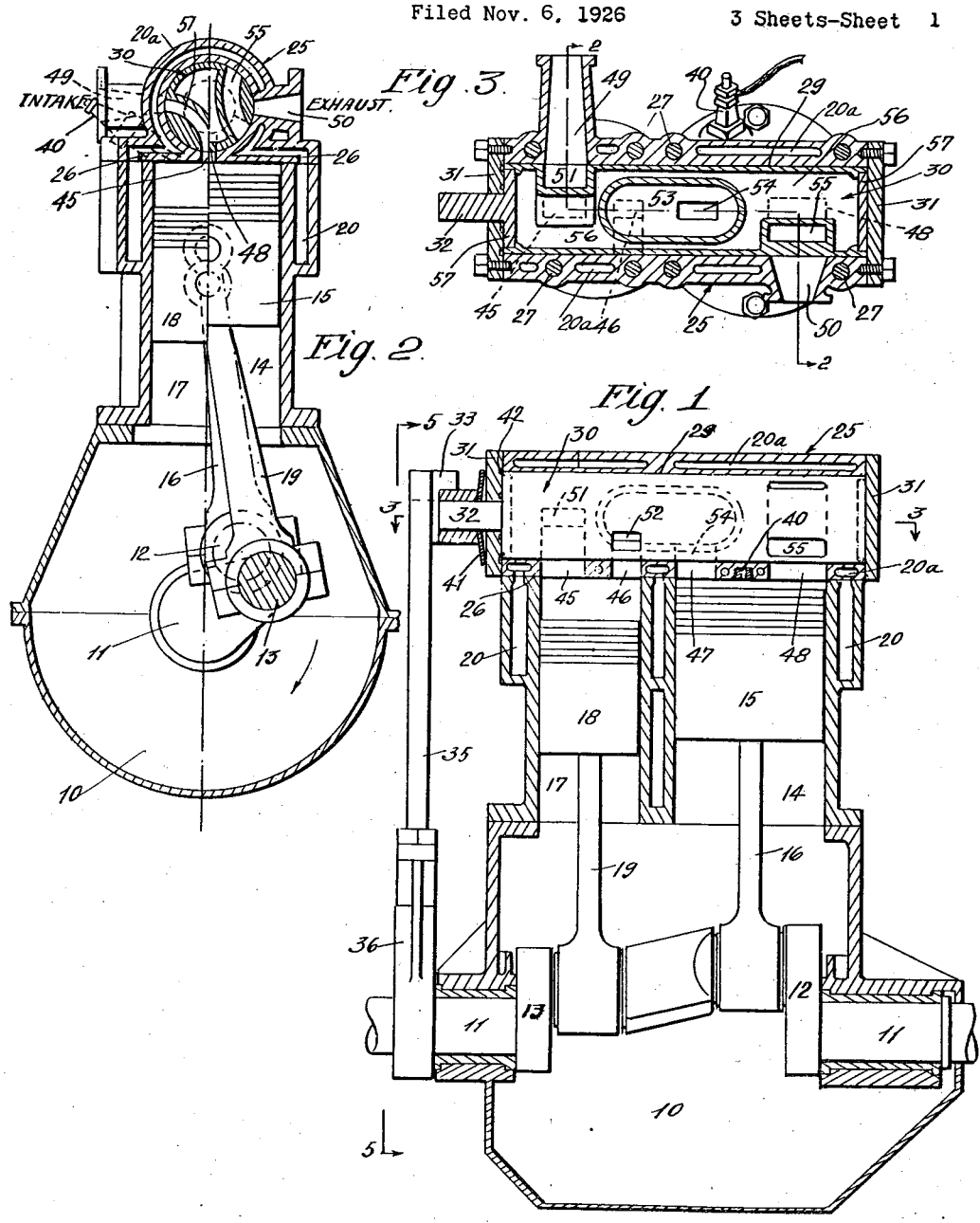

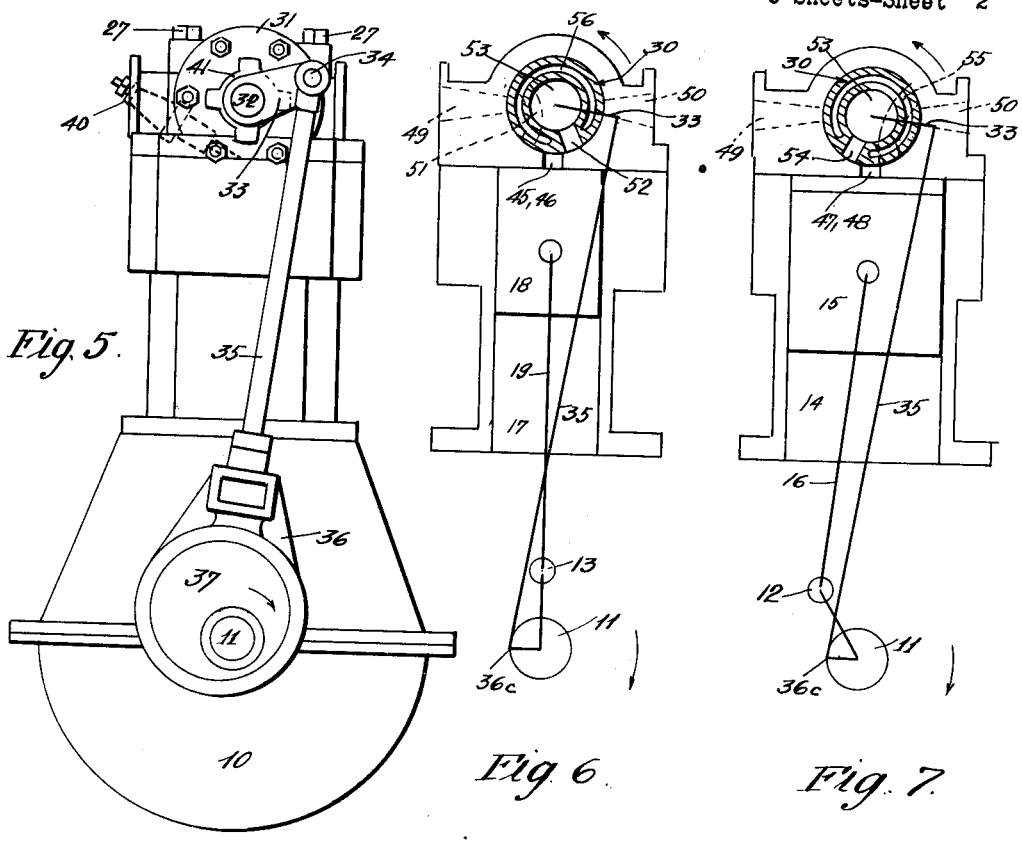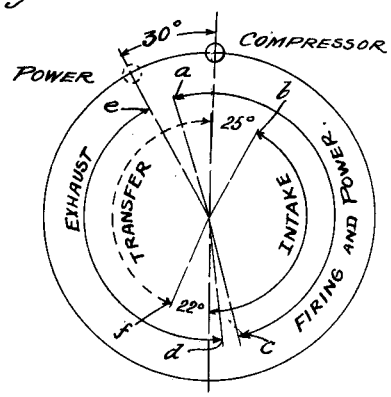

Feb. 11, 1930.  O. H. ENSIGN  1,746,728
INTERNAL COMBUSTION ENGINE
Filed Nov. 6, 1926   3 Sheets-Sheet 3
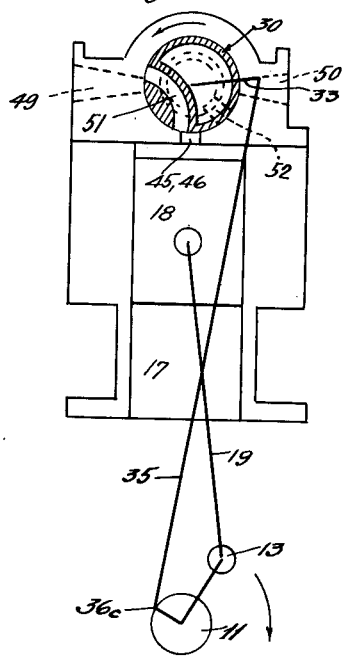
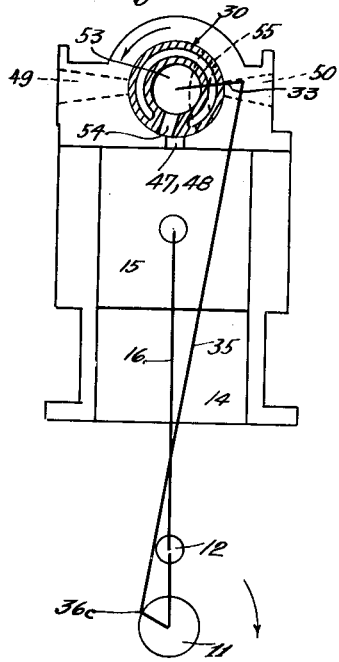
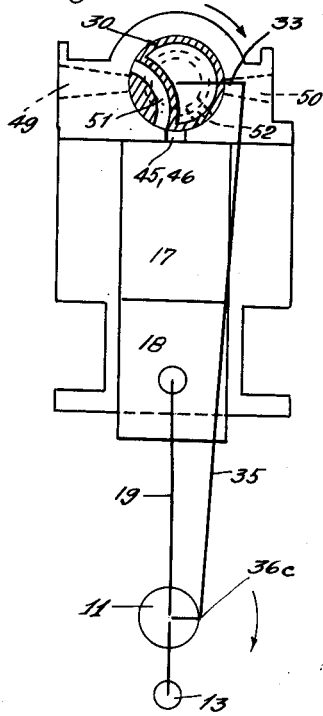
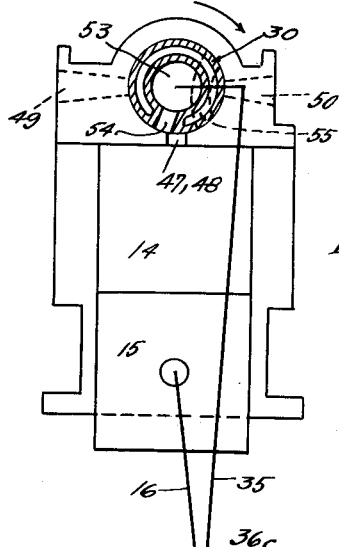
Inventor
Orville H. Ensign
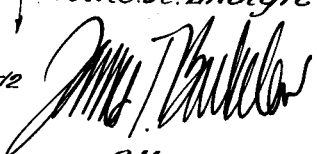
Attorney.

Patented Feb. 11, 1930

1,746,728

UNITED STATES PATENT OFFICE

ORVILLE H. ENSIGN, OF PASADENA, CALIFORNIA

INTERNAL-COMBUSTION ENGINE

Application filed November 6, 1926. Serial No. 146,635.

This invention has to do with certain improvements in the art of internal combustion engines, and are described hereinafter in connection with the art of two-stroke internal combustion engines of the constant volume type. The improvements herein referred to are capable of general application to internal combustion engines, but have been made more specifically, but not limitedly, in connection with the type of engine hereinabove stated and to the type of engine set out in my prior United States Letters Patent No. 1,536,780, issued May 5, 1925, and entitled Automotive engine art.

It will be unnecessary in this specification to dwell in detail upon all of the advantageous features inherent in the type of engine hereinafter described, as those are set forth in said Letters Patent. It will only be desirable here to describe in detail the improvements with which the present invention is concerned, and to give a general description of the fundamental features of the engine as a whole.

As set out in said issued patent, my engine comprises a compression cylinder, a work cylinder acting in cooperation with the compression cylinder, and both controlled by a single valvular means which also acts as an isolating chamber into which the combustible or comburent charge is first compressed, then isolated from the compression cylinder, and then, upon ignition, delivered into the work cylinder to be expanded therein to a final exhaust pressure very close to atmosphere. The inherent nature of the engine facilitates very greatly the compression of an initially cold charge, minimizes not only the general heat losses but also particularly minimizes the volumetric efficiency loss resulting in ordinary engines from heating of the charge before or during compression, saves a large percentage of ordinarily wasted heat by transfer of heat to the isolated compressed charge, and moreover makes it possible and practicable to utilize high compression and at the same time to expand the burnt charge practically fully. The results, proved by thorough experiments and tests, have been the production of an engine showing not only a theoretic increase of fifty per cent above the best present practice in point of cycle efficiency, but also a commensurate increase in actual power efficiency under practical conditions.

Several minor difficulties have been encountered in the engine described in detail in said prior patent, most of those difficulties having to do with the valve and its action. The cyclic sequences of operations in my engine made it desirable that the piston in the power cylinder shall lag behind the piston in the compression cylinder by a certain amount, say approximately thirty degrees of crank travel; and in my prior design the two cylinders were placed at an angle to each other, the control valve being placed between the two cylinders and having two ports situated more or less opposite each other, one port communicating with the compression cylinder and the other port communicating with the work cylinder. This valve, with its hollow interior, forms the isolation chamber and is purposely exposed in some degree at least to the heat of combustion so that heat may be transferred from a previous combustion to a subsequently compressed charge. It has been found that upon continuous running of such a valve the heating of its parts directly around the two opposite ports tends to make the valve material (usually cast iron) grow; so that the valve becomes more or less deformed and expanded. This growth might not be objectionable in some cases; but in engines operated more or less continuously under heavy load the growth might be sufficient to cause sticking or leaking of the valve, particularly as the growth takes place at areas on opposite sides of the valve. Among other things the present invention makes a new arrangement of cylinders and valves so that the ports and those parts of the valve most greatly subjected to heat are arranged on one side of the valve. Consequently any growth that may take place will be mainly present only at one side of the valve and, if not too great, may be easily taken care of by natural wear of the valve in its casing. In fact it may not be objectionable in the least to have a slight amount of growth take place around the valve openings communicating with the two cylinders, as long as that growth will not in any case be faster than can be worn away by natural wear of the valve in its case. If such is the condition the growth may be desirable as it has the effect of keeping the valve in close engagement with the casing on those areas immediately surrounding the ports.

There are other improvements in the present design, all of which will best appear from the following specification; but it may be well to mention preliminarily the fact that the valvular action in the present engine is now all contained within a single valve that forms the insolation chamber; and also that the isolation chamber and the ports through the valve are surrounded by a jacket of oil which acts to some extent as a heat insulator and also as a distributor of heat from the combustion chamber (the isolation chamber) to the exterior surface of the valve, with the result that the valve, under the influence of high temperature, expands uniformly and evenly and transmits heat uniformly and evenly to the whole of the casing so that the casing also expands uniformly and in substantial consonance with the valve expansion.

With these preliminaries in mind, the improvements concerned in the present invention will now be best understood from the following detailed description of a preferred embodiment of said improvements, reference for this purpose being had to the accompanying drawings, in which:

Fig. 1 is a vertical longitudinal central section of an engine in accordance with the present invention;

Fig. 2 is a cross section taken half through the compression cylinder and half through the work cylinder, and through corresponding half parts of the valve, as is indicated by line 2—2 on Fig. 3;

Fig. 3 is a horizontal section taken on line 3—3 of Fig. 1;

Fig. 4 is a diagram indicating the cyclic sequences of operation of the engine;

Fig. 5 is an end elevation taken as indicated by line 5—5 on Fig. 1;

Fig. 6 is a diagrammatic section through the compression cylinder and the corresponding part of the valve, showing the relative positions of the parts when the compression piston is at the top of its stroke;

Fig. 7 is a similar diagrammatic section through the work cylinder and its corresponding part of the valve, showing the positions of the parts corresponding to the positions of Fig. 6;

Figs. 8 and 9 are similar diagrammatic sections through the compression and work cylinders, respectively, showing the relative positions of the parts when the work piston has reached the top of its stroke; and Figs. 10 and 11 are similar diagrammatic sections showing the positions of parts when the compression piston has reached the bottom of its stroke.

It will of course be understood that an engine of the character I describe here may be built and operated with any number of work and compression cylinders; but as a single work cylinder and a single compression cylinder form a complete engine unit, I have illustrated and shall describe only one such unit.

In the drawings the numeral 10 designates what may be any ordinary or suitable crank case, carrying crank shaft 11 with its two crank throws 12 and 13. In the present specific design crank 12 of the work cylinder is located at 30° behind crank 13 of the compression cylinder; and although a certain amount of such lag is desirable, the exact amount of lag herein specified is not a limitation upon the invention. And it may be well here to remark that neither are any of the particular angles of rotation hereinafter spoken of limitations upon the invention. I simply give specific figures in that, and other, regards throughout this specification for the purpose of enabling those skilled in the art to have full and complete understanding of the invention by way of full, complete and specific understanding of one concrete embodiment thereof.

A work cylinder 14 has a work piston 15 therein connected to crank throw 12 by connecting rod 16. A compression cylinder 17 has a compression piston 18 therein connected to crank throw 13 by connecting rod 19. The two cylinders are, as shown in the drawings, preferably arranged in a single upright plane, so that the axes of the two cylinders are parallel and these two cylinders are preferably arranged closely adjacent each other with space for the water or other cooling jacket 20 to extend between them. This water jacket 20 extends upwardly into the valve casing, as is indicated at 20ª and as will be well understood from the drawings without the necessity of any further description.

Compression cylinder 17 is usually in practice somewhat smaller than work cylinder 14; the relative sizes of the two cylinders being determined by a consideration of the volume of combustible mixture or comburent that can be, after high compression, expanded substantially to atmospheric pressure in the work cylinder. It is well understood that, where high compression is used, the ratio of expansion after combustion must be substantially larger than the ratio of previous compression, in order to expand the burned charge back to substantially atmosphere. Fundamentally that is the reason why the ordinary two-stroke or four-stroke engine, which compresses its charge with its work piston, must finally exhaust at a pressure substantially above atmosphere. Consequently, in order to obtain full expansion, it is necessary that the volume at atmosphere of the initial charge shall be less than the volume after expansion; the determination of the exact ratio depending, among other things, upon the compression utilized. The inherent capability of my engine to expand fully to substantially atmosphere, and also its freedom from liability of pre-ignition due to high compression, has enabled me in this engine to utilize in practice a much higher degree of compression that has been practically possible in other engines of the constant volume type.

The valve casing designated generally by the numeral 25 is mounted upon the upper ends of cylinders 14 and 17 and provides not only a casing for the valve but also heads for the cylinders. The valve casing is substantially cylindric in form, contains the cooling jacket 20ª, and has at its bottom a flat flange 26 which seats on the head ends of the cylinders to form the cylinder heads; being held down to the cylinders by bolts or cap screws 27. It has an interior valve bore 29 which takes the cylindric oscillating valve that is generally designated in the drawings by the numeral 30. The valve casing is closed at its two opposite ends by caps 31, the valve operating shaft 32 extending through one of them. The valve shaft 32 carries a valve operating arm 33 to the end of which at 34 is pivotally connected a rod 35 that connects at its lower end with eccentric strap 36 operating upon an eccentric 37 mounted on crank shaft 11. The throw of the eccentric and the relative arrangements of the connecting parts cause the valve to be oscillated in the manner to be hereinafter described.

Ignition of the charge in the combustion chamber may be effected by any suitable means; I have here indicated a spark plug 40 which extends into communication with the upper end of work cylinder 14. The means of lubricating the various parts of the engine, including the pistons and the valves, need not here be explained, as various suitable methods of lubrication are well known, I may state, however, that the valve itself requires very little lubricant for its proper operation. In order to keep the valve from slipping endwise in its casing, without the necessity of fitting the valve closely between the two casing caps 31, a spring washer 41 may be interposed between arm 33 and cap 31 to pull the valve against that cap, which is provided on its interior face with lubricant grooves 42.

The head of cylinder 17 (the base 26 of valve casing 25) is provided with an intake port 45 and also with a transfer port 46. The head of work cylinder 14 has a firing port 47 and an exhaust port 48. These ports are all arranged in line and, in the particular design here shown, are all of the same width (see Fig. 3) although they may be and are shown to be of various lengths. Valve casing 25 has an initial intake port 49 and a final exhaust port 50. Valve 30 has in it an intake passage 51 adapted in a certain position of the valve to register with intake ports 45 and 49 (see particularly Figs. 2 and 8). Also the valve has a transfer port 52 adapted to register with cylinder transfer port 46 and leading to the isolation and combustion chamber 53 located within the valve. From chamber 53 a firing port 54 leads to register with firing port 47 of cylinder 14; and the valve also has an exhaust passage 55 adapted to register between cylinder exhaust port 48 and final exhaust port 50. The relative locations of these several valve ports will be well understood from a consideration of the drawings and of the following description of operation.

Each of the ports within valve 30 is enclosed within suitable walls, as is clearly shown in the various figures, and the interior of the valve has an oil receiving space 56, which space surrounds the various port walls and the wall of chamber 53. In other words, the valve 30 is in structure a hollow cylinder with the several walled ports and chamber 53 contained within its hollow interior; and the hollow cylinder of the valve is closed at its opposite ends with caps 57. These caps may be held in the valve cylinder in any suitable manner, as by being force welded; the interior of the valve having been previously filled with high temperature oil—oil that will have little vapor generation at the temperatures to which the valve is subjected. The oil serves in some degree as a heat insulator to the isolation and combustion chamber, holding some heat from each combustion in that chamber; at the same time it seems to distribute equally the heat desired to be dissipated from the chamber distributing that heat evenly throughout the valve and to the oil film surrounding the valve and thus to the valve casing.

Figs. 6 and 7 diagrammatically show the relative positions of the parts when the compressor piston 18 has reached the top of its stroke. The valve is then oscillating in a direction indicated by the arrows, intake passage 51 is out of communication with the corresponding ports and transfer passage 52 has just passed out of communication with compression cylinder transfer port 46. The charge has thus just been compressed into chamber 53 and is just about to be delivered through valve port 54 to the work cylinder firing port 47. Work piston 15 is just approaching the top of its stroke and is traveling comparatively slowly while the valve 30 is in this position traveling at its maximum speed, due to the relative position of the eccentric center as shown at 36°. Thus as the work piston 15 approaches the upper end of its stroke, valve port 54 is rapidly moving toward registration with port 47, and it reaches the beginning of such registration at some angular advance ahead of piston 15 reaching the top of its stroke. The angular position of the power crank at the time the firing port opens is indicated at the point labeled $a$ in Fig. 4. This is the point at which the isolated charge begins to communicate with the work cylinder and is also the point at which firing of the charge takes place. It is a peculiarity of my engine that the angular advance (of about 18° in this illustrated design) at which the firing port opens and at which ignition takes place does not need to be varied throughout a very wide range of engine speed.

As I have said, the valve is traveling at its highest speed as the work piston approaches the top of its stroke, so that by the time the work piston has reached the top of its stroke as shown in Fig. 9, the firing port (the registration of ports 47 and 54) is quite widely open. During the movement of piston 15 from the position shown in Fig. 7 to the position shown in Fig. 9 the charge, which has been let into the work cylinder beginning at a piston position just above that shown in Fig. 7, has been ignited and has been forced back into combustion chamber 53. This action results in great turbulence of the charge and immediately ignites the whole charge in chamber 53. Expansion of charge under full pressure thus begins at the piston position shown in Fig. 9 and as soon as the work piston 15 has moved down a short distance to such a position as shown in Fig. 2, the firing port is then wide open to allow free communication between the combustion chamber and the work cylinder.

Going back again to the positions shown in Figs. 6 and 7 it will be noted that with the compression piston at the upper end of its stroke the intake passage 51 in the valve is not in register with the intake port 45. However the quick movement of the valve at that stage of the operation brings intake passage 51 quickly into register with the intake ports 49 and 45 so that by the time the compression piston 18 has traveled a short distance downwardly, as shown in Fig. 8, the intake to the compression piston is quite widely open. Then as the compression piston 18 moves on downwardly on its intake stroke and reaches such a position as shown in Fig. 2, where the piston is moving at its highest velocity, the intake to the compression cylinder is wide open and the valve is moving comparatively slowly so that the condition of wide open intake remains in effect over a comparatively long period. At the corresponding position (Fig. 2) of the work piston, when the work piston is attaining its highest downward speed, the comparatively slow movement of the valve also keeps the firing ports (ports 47 and 54) wide open for a comparatively long period, allowing free passage of the expanding gases from chamber 53 to the work cylinder. The angular point at which the intake to the compression cylinder opens is shown at $b$ in Fig. 4.

The intake to the compression cylinder remains open until the compression piston 18 reaches the bottom of its stroke, as shown in Fig. 10. In this position of the ports the valve is again traveling at substantially its maximum speed and thus moves quickly from a wide open position to the closed position shown in Fig. 10. And in the corresponding position of the work piston, as shown in Fig. 11, the firing ports 54 and 47 are rapidly being moved out of register, these ports finally closing at the angular position designated $c$ in Fig. 4. In this last mentioned position of the work piston 15 exhaust port 55 of the valve is just about to register with cylinder exhaust port 48, that registration beginning at the point indicated $d$ in Fig. 4 just before the work piston reaches its lowermost position. As the work piston then proceeds on its upward stroke the exhaust remains open until the work piston reaches approximately the position shown in Fig. 7, or at the point indicated $e$ in Fig. 4, which is, in this particular design, 30° of crank rotation before the work piston reaches the upper end of its stroke. In the meantime, and after the compression piston 18 has started its upward stroke, the transfer port 52 begins to register (at the point indicated $f$ in Fig. 4) with cylinder port 46, and the transfer port thus remains open during the remainder of the upward travel of the compression piston to the position shown in Fig. 6, in which position the transfer port has just closed. When this transfer port closes it will be noted that firing port 54 is still somewhat out of register with cylinder firing port 47, so that for a short period after the position of Figs. 6 and 7 the compressed charge is isolated in chamber 53, that chamber not then being in communication with either cylinder. The firing port does not open until after the transfer port has closed, but the transfer port can and does remain open until the compression piston has reached the top of its stroke, while the firing port can and does open before the work piston reaches the top of its stroke. These relations are rendered possible by the lag of the work piston behind the compression piston.

It will be noted that the piston strokes are so related to their cylinders that there is no clearance at the tops of the strokes. Consequently the closing of the exhaust at the point $e$ in Fig. 4 leaves in the work cylinder only a very small volume of burnt gases; a much smaller proportionate volume than is ordinarily left in the cylinders of either a two-stroke or a four-stroke engine. The exhaust, however, is closed before the new expanding charge is admitted to the work cylinder, so that there is no possible chance of loss of the new charge through the exhaust port. The cycle of the work cylinder is thus as follows: Just before the work piston reaches top dead center the new charge is admitted and ignited, ignition being forced back into the isolation chamber. Upon the immediately ensuing down stroke of the work piston the firing port between the cylinder and the valve chamber opens to wide position very quickly so that upon the piston down stroke the expanding gases have free entry to the cylinder. During the greater portion of the piston down stroke, the firing port is relatively wide open, due to the fact that at the time the piston is moving at greatest velocity the valve is moving at lowest velocity. Then as the work piston approaches the bottom of its stroke the firing port is closed quickly and the exhaust port immediately opens to remain open until a time just before the firing port again opens for the next cycle; and again due to the fact that the valve is traveling at its lowest velocity when the work cylinder is traveling at its highest velocity, the exhaust port remains substantially wide open during a large proportion of the upward travel of the work piston.

In fact, as will be seen from an examination of the various diagrams, and from consideration of the relative positions of the cranks and the eccentric, the valve is always traveling at its least velocity when the pistons are traveling at their greatest velocities, slow travel of the valve under those conditions maintaining wide open ports when the pistons are traveling fastest. And when the pistons are traveling at their lowest velocities at or near the end of their strokes, the valve is then traveling at its highest velocity, and this results in very quick opening and closing of the various ports, which openings and closings take place when the pistons are at or near the upper or lower positions.

The cycle of the compression cylinder may be briefly resumed as follows: At a time when the compression piston has passed down slightly from its uppermost position (just slightly past the position shown in Fig. 6) the intake opens quickly so that by the time the piston has reached the position shown in Fig. 8 the intake is opened to some considerable extent. The intake then opens quickly to its maximum, while the compression piston travels down and the intake finally closes quickly when the compression piston reaches its lowermost position, as shown in Fig. 10. Then the compression piston begins its up stroke and the transfer ports 46 and 62 begin to register at the point designated $f$ in Fig. 4. These transfer ports do not register to allow compression of the charge into chamber 53 until the firing ports to the work cylinder have closed at the point designated $c$ in Fig. 4, although that point is very close to the lowermost position of the work piston. This relation again is rendered possible by the lag of the work piston behind the compression piston. This relation of firing port closure and transfer port opening may be seen from an inspectoin of Figs. 10 and 11, where it will be noted that the firing ports 54 and 47 are very nearly out of register, while transfer port 52 has to travel a considerably greater distance to come into register with the corresponding cylinder transfer port 46.

The transfer port from the compression cylinder to isolation chamber 53 then remains open until the compression piston reaches its uppermost point, the whole charge being thus compressed into the isolation chamber before the firing port to the work cylinder opens at a point before the work piston reaches the top of its stroke.

I claim:

1. An internal combustion engine comprising an expansible chamber having a movable wall adapted to transmit power; a compressor adapted to compress comburent charges; means adapted to receive within itself and thereby isolate each single compressed charge of comburent from said compressor and to open the same to said expansible chamber by the movement of said means, and said means also embodying a jacket substantially surrounding the charge receiving space and adapted to contain a high vaporizing point liquid.

2. An internal combustion engine comprising compressor and work cylinders, a single cylindric oscillating valve controlling both cylinders, the compressor cylinder having an intake port and a transfer port, the work cylinder having a firing port and an exhaust port, and said oscillating valve containing a charge isolation and combustion chamber with ports alternately registerable with said transfer port and said firing port, and said oscillating valve also containing an inlet passage adapted to register with said inlet port and an exhaust passage adapted to register with said exhaust port, said cylinder ports being arranged in the heads of said cylinders and substantially in line with each other, and said cylindric oscillating valve being arranged directly above the heads of said cylinders.

3. An internal combustion engine comprising compressor and work cylinders, a single cylindric oscillating valve controlling both cylinders, the compressor cylinder having an intake port and a transfer port, the work cylinder having a firing port and an exhaust port, and said oscillating valve containing a charge isolation and combustion chamber with ports alternately registerable with said transfer port and said firing port, said oscillating valve also containing an inlet passage adapted to register with said inlet port and an exhaust passage adapted to register with said exhaust port, and said oscillating valve having a hollow interior surrounding said isolation chamber and said passages and adapted to contain oil or the like.

4. An internal combustion engine comprising compressor and work cylinders, a single cylindric oscillating valve controlling both cylinders, the compressor cylinder having an intake port and a transfer port, the work cylinder having a firing port and an exhaust port, and said oscillating valve containing a charge isolation and combustion chamber with ports alternately registerable with said transfer port and said firing port, said oscillating valve also containing an inlet passage adapted to register with said inlet port and an exhaust passage adapted to register with said exhaust port, said cylinder ports being arranged in the heads of said cylinders and substantially in line with each other, said cylindric oscillating valve being arranged directly above the heads of said cylinders, and said oscillating valve having a hollow interior surrounding said isolation chamber and said passages and adapted to contain oil or the like.

5. An internal combustion engine comprising a compressing cylinder and a work cylinder arranged substantially in a single upright plane, pistons in said cylinders, a crank shaft with cranks connecting with said pistons, the crank of the work piston being arranged at an angular lag behind the crank of the compressor piston, the head of the compressor cylinder having therein an intake port and a transfer port, and the head of the work cylinder having therein a firing port and an exhaust port, a cylindric valve casing mounted directly on the cylinder heads, all of said ports being substantially in a single line and the axis of said casing being parallel to the line of said ports, a single cylindric valve member mounted to oscillate in said casing, said valve member being hollow and having within its hollow interior a walled intake passage adapted to register with said intake port, a walled isolation and combustion chamber with passages adapted alternately to register with said transfer port and said firing port, and a walled exhaust passage adapted to register with said exhaust port, the interior space in said hollow valve surrounding said walled passages and chamber adapted to contain a charge of oil or the like, and means operable from the crank shaft to oscillate said valve member.

6. An internal combustion engine comprising compressor and work cylinders; a single valve controlling both cylinders, said valve containing an alternating clearance between and for the compressor and work cylinders to receive the compressed charge, isolate it, and deliver it to the work cylinder, and said valve also containing an intake port for the compression cylinder and an exhaust port for the work cylinder.

7. An internal combustion engine comprising an expansible chamber having a movable wall adapted to transmit power; a compressor adapted to compress comburent charges; means adapted to receive within itself and thereby isolate each single compressed charge of comburent from said compressor and to open the same to said expansible chamber by the movement of said means, and said means also containing within itself an intake port for the compressor and an exhaust port for the expansible chamber.

8. The combination with an expansible chamber of an internal combustion engine; of a compressor adapted to compress comburent charges; an oscillating valve between the compressor and the expansible chamber adapted to receive within itself the complete compressed charge of comburent from the compressor and to isolate the same and thereafter to open said isolated charge to the contracted expansible chamber, and said oscillating valve also containing an inlet port for the compressor and an exhaust port for the expansible chamber.

In witness that I claim the foregoing I have hereunto subscribed my name this 29th day of October, 1926.

ORVILLE H. ENSIGN.